(12) United States Patent
Fitzgerald et al.

(10) Patent No.: US 8,692,660 B2
(45) Date of Patent: Apr. 8, 2014

(54) COMBINATION INSTRUMENT

(75) Inventors: Manfred Fitzgerald, Chiesanuova (IT); Filippo Perini, Bobbio (IT); Corrado Rebottini, Crevalcore (IT); Stefano Mazzetti, Caslecchio di Reno (IT)

(73) Assignee: Automobili Lamborghini S.p.A., Sant' Agata Bologns (IT)

( * ) Notice: Subject to any disclaimer, the term of this patent is extended or adjusted under 35 U.S.C. 154(b) by 415 days.

(21) Appl. No.: 12/677,389

(22) PCT Filed: Aug. 9, 2008

(86) PCT No.: PCT/EP2008/006590
§ 371 (c)(1),
(2), (4) Date: Oct. 26, 2010

(87) PCT Pub. No.: WO2009/033537
PCT Pub. Date: Mar. 19, 2009

(65) Prior Publication Data
US 2011/0037583 A1 Feb. 17, 2011

(30) Foreign Application Priority Data
Sep. 10, 2007 (DE) .................. 10 2007 042 652

(51) Int. Cl.
*B60Q 1/00* (2006.01)
*B60Q 1/54* (2006.01)
*B60K 35/00* (2006.01)
*B60K 37/02* (2006.01)

(52) U.S. Cl.
CPC . *B60Q 1/54* (2013.01); *B60K 35/00* (2013.01); *B60K 2350/1072* (2013.01); *B60K 37/02* (2013.01)
USPC .............. 340/441; 348/148; 362/23; 715/772

(58) Field of Classification Search
CPC .. B60Q 1/54; B60K 35/00; B60K 2350/1072; B60K 37/02
USPC ......... 340/441; 348/148; 362/23, 29; 701/36, 701/454; 715/772, 841
See application file for complete search history.

(56) References Cited

U.S. PATENT DOCUMENTS

| | | | | |
|---|---|---|---|---|
| 6,232,961 B1 * | 5/2001 | Kunimatsu et al. | ........... | 345/173 |
| 6,812,942 B2 * | 11/2004 | Ribak | ............ | 701/454 |
| 6,966,663 B2 * | 11/2005 | Wada et al. | ............ | 362/29 |
| 7,324,878 B2 * | 1/2008 | Imai et al. | ........ | 362/23 |
| 8,013,889 B1 * | 9/2011 | Hong et al. | ............ | 348/148 |
| 2009/0228175 A1 * | 9/2009 | Borgesson | ............ | 715/772 |

FOREIGN PATENT DOCUMENTS

| | | |
|---|---|---|
| DE | 3912359 A1 | 10/1990 |
| DE | 4307367 A1 | 9/1994 |
| DE | 19754249 A1 | 6/1999 |
| DE | 19903201 A1 | 8/2000 |
| DE | 19949548 A1 | 4/2001 |
| DE | 10046763 A1 | 4/2002 |
| DE | 10065602 A1 | 7/2002 |
| DE | 10241267 A1 | 3/2004 |
| DE | 10249765 A1 | 5/2004 |
| DE | 10341846 A1 | 5/2005 |
| DE | 102005035481 A1 | 2/2007 |
| EP | 1024056 A | 8/2000 |
| WO | 98/38059 | 9/1998 |
| WO | 2007021263 A | 2/2007 |

* cited by examiner

*Primary Examiner* — John A Tweel, Jr.
(74) *Attorney, Agent, or Firm* — Staas & Halsey LLP

(57) ABSTRACT

An instrument cluster for the instrument panel of a motor vehicle has at least one display on which relevant operational data of the vehicle can be displayed. The at least one display is freely programmable with respect to the data displayed on it and can be switched between at least two different configurations.

20 Claims, 2 Drawing Sheets

COMBINATION INSTRUMENT

The invention relates to an instrument cluster for the instrument panel of a motor vehicle.

BACKGROUND OF THE INVENTION

Generic instrument clusters are known from the general prior art. They are used to provide the driver with information regarding various relevant operational data of the vehicle. Frequently, these instruments are used for several different vehicles of a manufacturer or several affiliated manufacturers. This does fundamentally reduce production costs compared to a solution in which a separate instrument cluster is used for each vehicle; but from an aesthetic standpoint this is not necessarily desirable and therefore often necessitates adaptations, which in turn increase costs.

Therefore, the object of this invention is to devise an instrument cluster for the instrument panel of a motor vehicle which can be easily used for various motor vehicles.

SUMMARY OF THE INVENTION

The free programmability of at least one display with respect to the data displayed on it makes it possible to display the most varied types of data in conjunction with the most varied designs on the same instrument cluster. The instrument cluster according to the invention hence can be used in the most varied motor vehicles without creating the impression of its being the same instrument. Furthermore, in this way costs can be reduced since only a small number of different add-on parts, for example only a different housing, is necessary to adapt an instrument cluster to the various circumstances of the instrument panel of the respective motor vehicle. Furthermore, the free programmability of at least one display, in the event of a facelift of the motor vehicle model or in the event of modifications, enables updating of the instrument cluster even for vehicles that have been in use for a long time.

The capacity of the display according to the invention to switch between at least two different configurations advantageously allows the driver of the vehicle to choose between different views of his cockpit and thus between various types in which he acquires information about vehicle-relevant data. Furthermore, in this way, simple adaptation of the instrument cluster to different motor vehicles can be achieved.

Improved display of the data, especially with respect to the visual clarity of a large volume of data, is possible when there are at least three freely programmable displays in one advantageous development of the invention.

In order to enable optimum determination and processing of vehicle-relevant data, it can furthermore be provided that all displays be connected via at least one control device to a sensor for measuring the relevant operational data of the motor vehicle.

In another advantageous configuration of the invention, it can be provided that the speed can be displayed on the first display, the rpm on the second display, and the acceleration of the motor vehicle on the third display. This ensures especially prompt and reliable allocation and processing of the data which are to be acquired by the driver, and, of course, additional data can also be displayed on each of the displays.

For certain applications or uses of the motor vehicle, it can be useful if, in addition to displaying the speed, the first display indicates the power delivered by the internal combustion engine.

In particular, when the motor vehicle is equipped with an electronic transmission, it is advantageous if the gear position engaged in the vehicle transmission can be displayed on the second display in addition to the rpm.

Furthermore, it can be provided that the third display be connected to an accelerometer. In particular, for sporty operation of a vehicle equipped with the instrument cluster according to the invention, this constitutes useful additional information for the driver.

DETAILED DESCRIPTION OF THE PREFERRED EMBODIMENTS OF THE DRAWINGS

Figure 1:
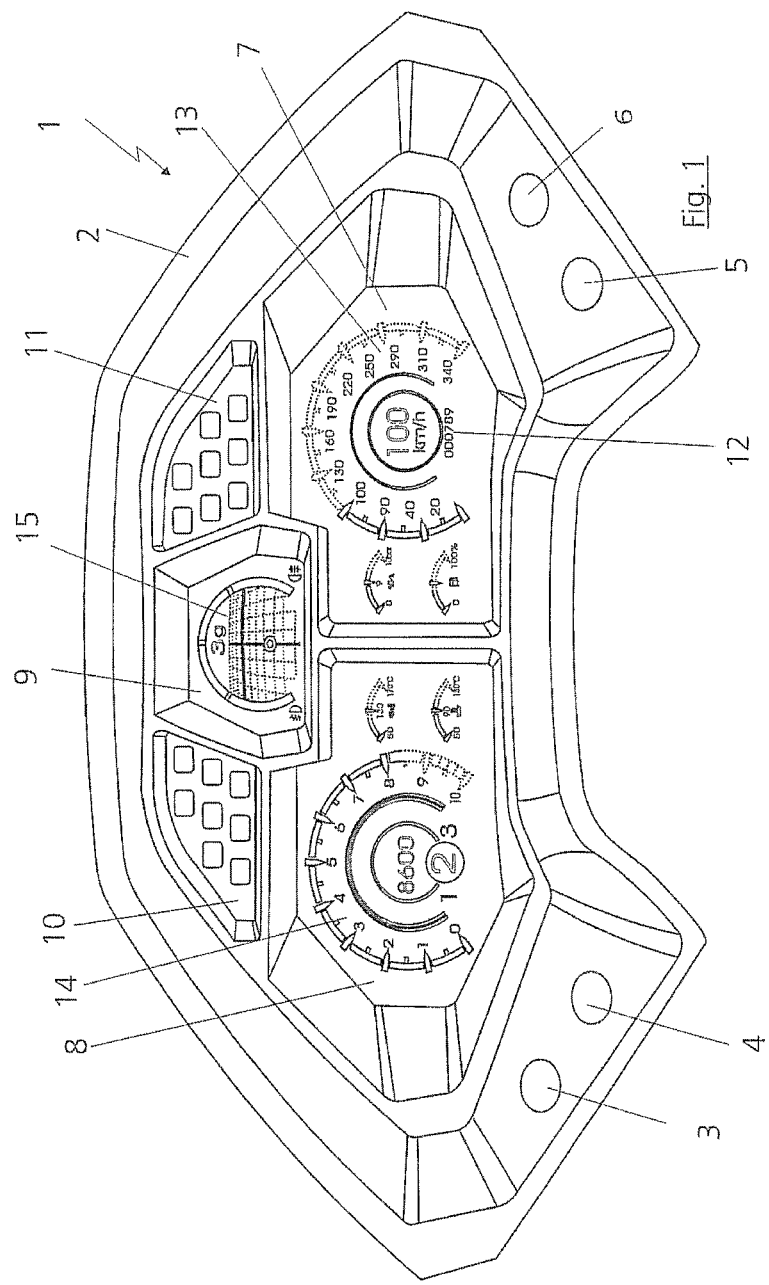
FIG. 1 shows the instrument cluster according to the invention in a first configuration.

FIG. 1 shows an instrument cluster 1 for a motor vehicle instrument panel, which is not shown in its entirety, said vehicle likewise not being shown. Since the arrangement of the instrument cluster 1 within the instrument panel and the arrangement of the instrument panel in the interior of the vehicle are known in and of themselves, they are not detailed here.

The instrument cluster 1 has a housing 2 on which, in the present case, four switches 3, 4, 5, and 6 are mounted, whose operation will be detailed below. Within the housing 2, the instrument cluster 1 has a total of five displays 7, 8, 9, 10, and 11, of which the two large displays 7 and 8, which are hereinafter referred to as the first display 7 and the second display 8, and the third display 9, which is located centrally above these two displays, are designed as TFT (thin film transistor) displays. On the displays 7, 8, and 9, the most varied relevant operational data of the vehicle, some of which are detailed below, can be displayed. The two other displays 10 and 11, which are located to the left and right of the third display 9, are equipped with LED display elements, which are not detailed and which can likewise undertake different display functions of relevant operational data of the vehicle, such as a turn signal indicator, an ABS function display, a battery display, and much more.

Figure 2:
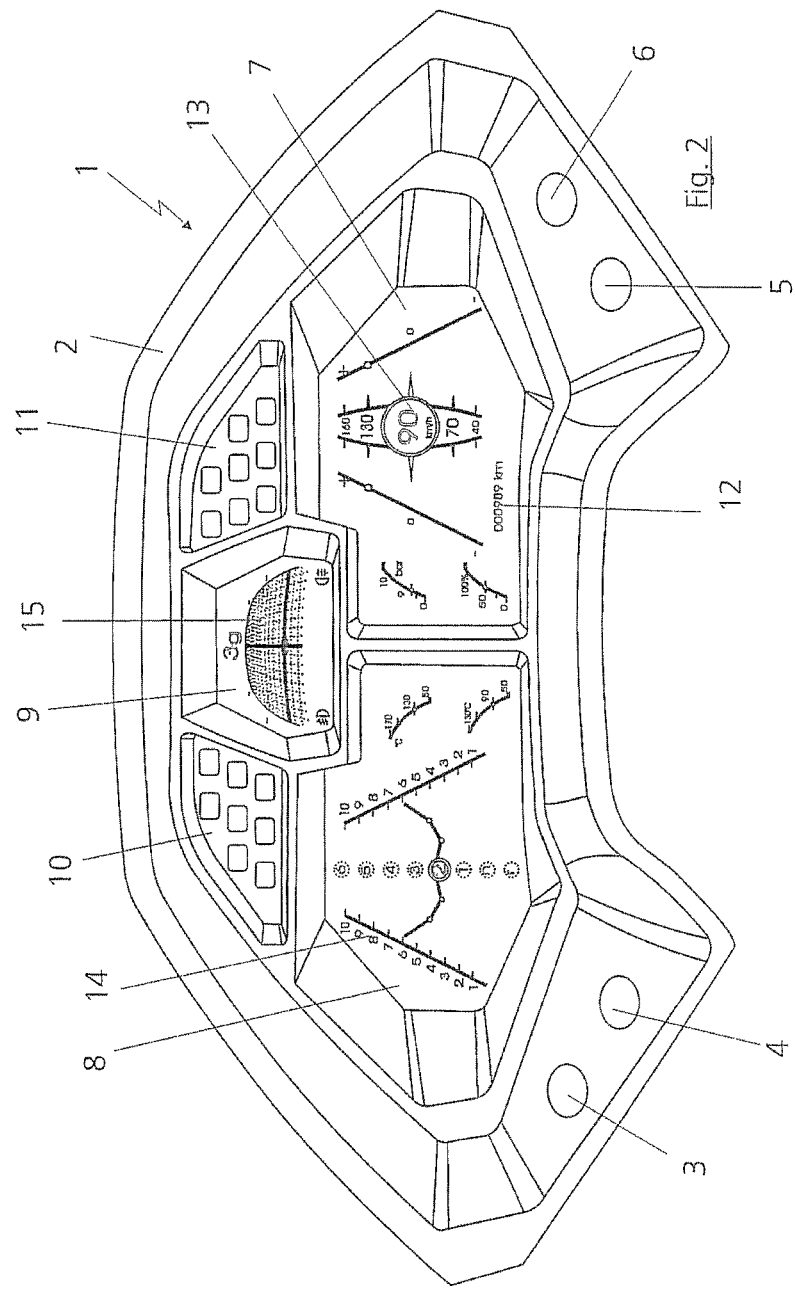
FIG. 2 shows the instrument cluster from FIG. 1 in a second configuration.

Of the aforementioned switches 3, 4, 5, and 6, the first switch 3 is used for setting the brightness of the instrument cluster 1, in particular of the displays 7, 8, 9, 10, and 11, the second switch 4 is used for resetting an odometer 12, which is provided on the second display 8, the third switch 5 is used for resetting functions of the instrument cluster 1, which are not detailed, and the fourth switch 6 enables switching of the displays 7, 8, and 9 between at least two different configurations of the instrument cluster 1. In the present case, the fourth switch 6 for this purpose must be pressed longer than two seconds. Basically, more than the two configurations or modes of the instrument cluster 1, which are shown in FIGS. 1 and 2, are conceivable. The first of these configurations of the instrument cluster 1, in this case, is the normal configuration or normal mode shown in FIG. 1, and the other is the racing configuration or racing mode shown in FIG. 2, i.e., a configuration which is especially useful when the motor vehicle equipped with the instrument cluster 1 is used on a race track. A comparison of the two FIGS. 1 and 2 shows that the two configurations are completely different representations. For use in another motor vehicle these configurations could exhibit even much greater differences.

The three displays 7, 8, and 9, which are designed as TFT displays, are freely programmable with respect to the data displayed on them. This means that by corresponding triggering, any image can be displayed on them by means of suitable software. In the present case, on the first display 7, both in the normal configuration and also in the racing configuration, the speed is displayed on the tachometer 13, and, in the normal configuration, both on a rotary indicator by means of a virtual moving pointer and also on a digital display, i.e., as a number that changes with speed. In the racing configuration the tachometer is made simply as a digital indicator. In addition, on the first display 7, both in the normal and also the racing configuration, the oil pressure and fuel gauge are, however, likewise displayed by means of different types of display. On the first display 7, in addition, in a manner not shown, the picture taken by a camera that records the surroundings of the motor vehicle can be displayed when this has been chosen by the driver. This can be a front and also a rear view camera. The tachometer 13 can optionally be masked out for display of the image. In the racing configuration, in addition to speed, the power delivered by the internal combustion engine or motor of the vehicle can be displayed on the first display 7 as a percentage of the maximum power, and by means of a point which moves along the respective oblique line between 0 and 100%.

On the second display 8, the rpm of the engine is displayed on the rpm counter 14, in turn, the display in the normal configuration differing from the display in the racing configuration. While in the normal configuration the rpm can be read both on the rotary indicator by means of a virtual moving pointer, and also on the digital display, and thus the rpm counter 14 here is optically matched to the tachometer 13 of the normal configuration, for the rpm counter 14 in the racing configuration, there are two obliquely running scales which are provided with numbers symbolizing the rpm, as a result of which there is optical matching to the display of the output of the internal combustion engine in the first display 7. In addition to the rpm, on the second display 8, the gear engaged in the transmission of a motor vehicle can be displayed by a corresponding number being circled. In the racing configuration, moreover, the indicated rpm is visually linked to the display of the gear engaged in the transmission, i.e., from the circle which, in this case, surrounds the number "2" for the engaged second gear, the respective lines run to that point on the scale of the rpm counter 14 corresponding to the current rpm, i.e., in the present case, the number 6" for an engine speed of 6000 rpm. This line therefore provides a dynamic indication of the relationship between the engaged gear and the engine speed. Furthermore, in the second display 8, there are the pertinent indications for the oil temperature and the coolant temperature, once again, in a different optical embodiment for the two configurations.

On the third display 9, by means of a point which is moving in a field 15, the acceleration of the motor vehicle can be displayed, for which the third display 9 is connected to an accelerometer which is not shown and which is preferably mounted in the instrument cluster 1. Both the acceleration and also the deceleration of the motor vehicle, as well as its lateral acceleration thus can be displayed; this can be especially useful in the racing mode of the motor vehicle, since, in this case, the driver visually acquires an impression or feedback of the driving state of his vehicle, especially with respect to lateral acceleration when driving on a curve. The third display 9 also provides for digital display of the current acceleration in the form of a number that is located above the field 15 and that changes according to the current acceleration. Underneath the field 15, in the present case, there are other display regions in which, for example, the control state of fog lights of the motor vehicle can be displayed. In general, however, with respect to their shape, color, and number, there can be pictograms, which are completely freely programmable and which, for example, can display the operating state of an all-wheel drive, a catalytic converter, or a spoiler, as well as various warning indicators. It is therefore possible to deliver a large amount of varied information on a relatively small area, since different data can be displayed on the same area due to the free programmability. If, for example, this is necessary due to the overly small amount of space available by the displays 10 and 11, in this region there can also be fixed displays in the form of LEDs, for example, for the aforementioned displays of the fog lights of the motor vehicle shown in the figures.

In the operating state of the vehicle, and thus also of the instrument cluster 1, unless otherwise selected by the driver, the normal configuration is conventionally set. In some countries this can even be mandatory. The third display 9, for example, in the operating state can display the locking state of the doors of the motor vehicle and only by the corresponding choice, for example, by briefly pressing the fourth switch 6, can it be shifted into the state in which the accelerometer is activated. This can also be mandatory in some countries. For certain countries, additional metric odometers 12 and tachometers 14 or those configured differently can also be used, in particular, to display the speed and distance traveled, also in miles.

All displays 7, 8, and 9, preferably also the displays 10 and 11, are connected by way of at least one control device, which is not shown, to the respective sensor for measuring the relevant operational data of the vehicle which are displayed on displays 7, 8, 9, 10 and 11, i.e., for example, a speed sensor or rotational speed sensor. For this purpose, it can be a good idea to use a CAN bus or similar line connection.

The invention claimed is:

1. An instrument cluster for the instrument panel of a motor vehicle, with at least one display on which relevant operational data of the vehicle can be displayed wherein at least one display is freely programmable with respect to the data displayed on it, and that the display can be independently switched, separately from a change to the vehicle other than the display, between at least two different configurations, wherein the same operational data is represented by different graphical representations in the different configurations.

2. The instrument cluster according to claim 1 wherein there are at least three freely programmable displays.

3. The instrument cluster according to claim 2 wherein speed can be displayed on a first of said display, the rpm on a second of said displays, and the acceleration of the motor vehicle on a third of said displays.

4. The instrument cluster according to claim 3 wherein at least in one of the configurations, in addition to the speed, the power delivered by the internal combustion engine can be displayed on said first display.

5. The instrument cluster according to claim 3 wherein at least in one of the configurations on said second of said display, in addition to the rpm, the gear engaged in the vehicle transmission can be displayed.

6. The instrument cluster according to claim 5 wherein at least in one of the configurations, the indicated rpm is visually linked to the display of the gear engaged in the transmission.

7. The instrument cluster according to claim 3 wherein said third display is connected to an accelerometer.

8. The instrument cluster according to claim 1 wherein on at least one of said displays, the picture taken by a camera recording the surroundings of the motor vehicle can be displayed.

9. The instrument cluster according to claim 1 wherein at least one of said displays is designed as a TFT display.

10. The instrument cluster according to claim 1 wherein one of the configurations is a normal configuration and the other is a racing configuration.

11. The instrument cluster according to claim 1 wherein the two configurations can be set by means of a switch.

12. The instrument cluster according to claim 1 wherein there are two other displays with LED display elements.

13. An instrument panel of a motor vehicle comprising at least one display programmed to display an image of selected one of diverse forms of representation indicating a sensed condition of said vehicle,
- wherein the display can be independently selected, separately from a change to the vehicle other than the display, from at least two different configurations, and
- wherein the sensed condition is represented differently in the different configurations.

14. An instrument panel according to claim 13 wherein said display comprises a TFT display.

15. An instrument panel according to claim 13 wherein said forms of representation include digital and analog devices.

16. An instrument panel according to claim 13 wherein said condition includes one of a group including rpm, engaged transmission gear, acceleration, speed and engine power.

17. An instrument panel according to claim 13 including a switch for selecting one of said forms.

18. An instrument panel according to claim 13 including at least one other type of display comprising an LED display.

19. An instrument panel according to claim 13 wherein said image comprises a photograph of an exterior surrounding segment of said vehicle.

20. An instrument panel comprising:
- a programmable display adapted for use in a plurality of motor vehicles of at least one of a different make and model, and configured to display an instrument cluster corresponding to the respective motor vehicle,
- wherein the programmable display can be independently switched, separately from a change to the vehicle other than the display, between at least two different configurations, and
- wherein the same operational data is represented differently in the different configurations.

* * * * *